United States Patent [19]

Mrazek et al.

[11] 4,409,168

[45] Oct. 11, 1983

[54] METHOD OF FORMING COMPONENTS FOR A HIGH-TEMPERATURE SECONDARY ELECTROCHEMICAL CELL

[76] Inventors: Franklin C. Mrazek, Hickory Hills; James E. Battles, Oak Forest, both of Ill.

[73] Assignee: The United States of America as represented by the U.S. Department of Energy, Washington, D.C.

[21] Appl. No.: 266,251

[22] Filed: May 22, 1981

[51] Int. Cl.³ .................................. H01M 2/16
[52] U.S. Cl. .................... 264/104; 264/299; 429/112
[58] Field of Search .............. 264/104, 299; 429/112

[56] References Cited

U.S. PATENT DOCUMENTS

| | | | |
|---|---|---|---|
| 3,442,715 | 5/1969 | Yee et al. | 252/426 |
| 3,666,560 | 5/1972 | Cairns et al. | 429/103 |
| 3,915,742 | 10/1975 | Battles et al. | 429/102 |
| 3,947,291 | 3/1976 | Yao et al. | 429/103 |
| 3,992,222 | 11/1976 | Walsh et al. | 429/221 |
| 4,011,374 | 3/1977 | Kaun | 429/220 |
| 4,086,396 | 4/1978 | Mathers et al. | 429/103 |
| 4,087,905 | 5/1978 | Cooper et al. | 29/623.1 |
| 4,306,004 | 12/1981 | Kaun et al. | 429/112 |

*Primary Examiner*—James H. Derrington
*Attorney, Agent, or Firm*—Hugh W. Glenn; Robert J. Fisher; Richard G. Besha

[57] ABSTRACT

A method of forming a component for a high-temperature secondary electrochemical cell having a positive electrode including a sulfide selected from the group consisting of iron sulfides, nickel sulfides, copper sulfides and cobalt sulfides, a negative electrode including an alloy of aluminum and an electrically insulating porous separator between said electrodes. The improvement comprises forming a slurry of solid particles dispersed in a liquid electrolyte such as the lithium chloride-potassium chloride eutetic, casting the slurry into a form having the shape of one of the components and smoothing the exposed surface of the slurry, cooling the cast slurry to form the solid component, and removing same. Electrodes and separators can be thus formed.

15 Claims, 3 Drawing Figures

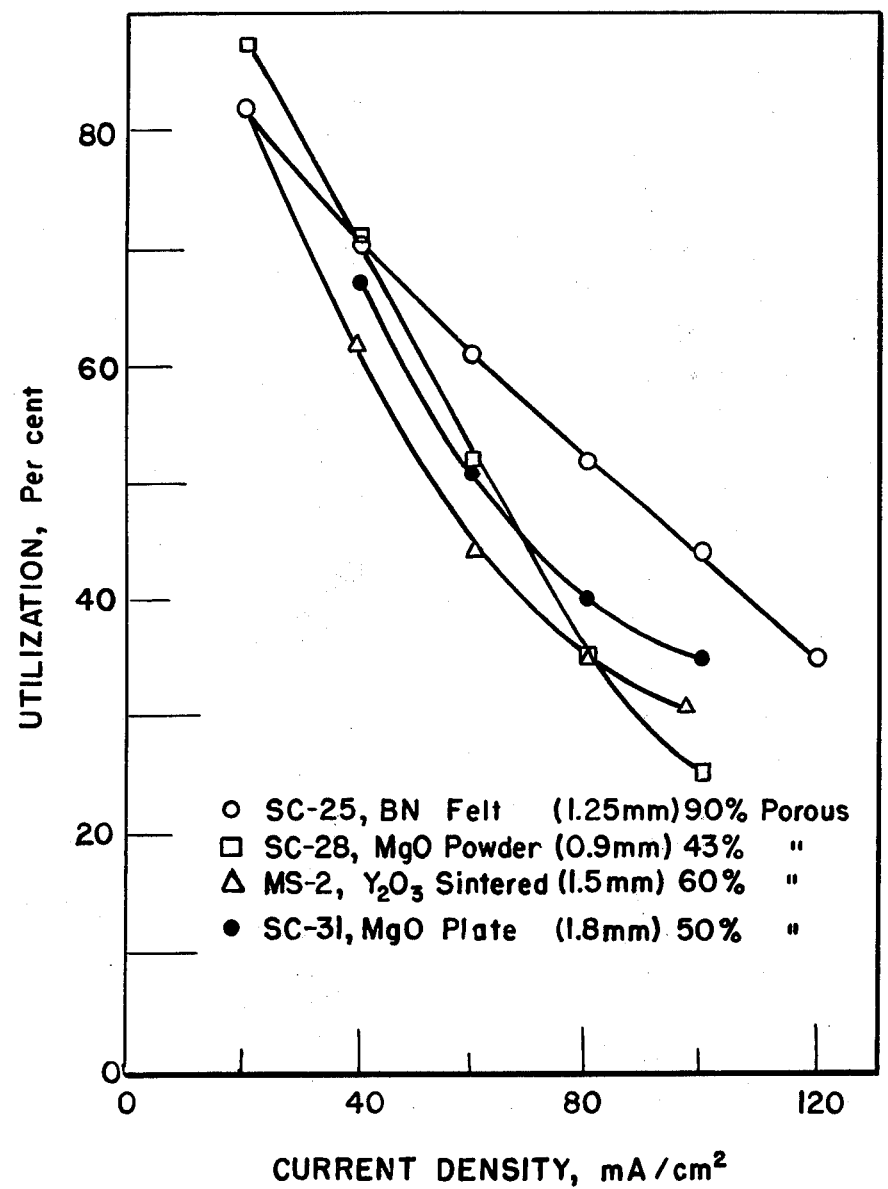

METHOD OF FORMING COMPONENTS FOR A HIGH-TEMPERATURE SECONDARY ELECTROCHEMICAL CELL

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to components for high-temperature secondary electrochemical cells including the positive and negative electrodes and separators therefor. Batteries of such electrochemical cells are contemplated for use as power sources for electric automobiles, storage of electric energy generated during intervals of off-peak power consumption and various other applications. The battery components of this invention are particularly applicable to electrochemical cells operated at high temperatures and therefore require the use of high-temperature insulators and electrodes.

A substantial amount of work has been done in the development of these types of electrochemical cells and their electrodes. Examples of such high-temperature cells and their various components are disclosed in U.S. Pat. No. 3,666,560 issued May 30, 1972 to Cairns et al. for Electrochemical Power-Producing Cell; U.S. Pat. No. 3,915,742 issued Oct. 28, 1975 to Battles and Mrazek for Interelectrode Separator For Electrochemical Cell; U.S. Pat. No. 3,947,291 issued Mar. 30, 1976 to Yao and Walsh entitled Electrochemical Cell Assembled In Discharged State; U.S. Pat. No. 3,992,222 issued Nov. 16, 1976 to Walsh et al. for Metallic Sulfide Additives For Positive Electrode Material Within A Secondary Electrochemical Cell; U.S. Pat. No. 4,086,396 issued Apr. 25, 1978 to Mathers et al. For Electrochemical Cell With Powder Electrically Insulative Material As A Separator; U.S. Pat. No. 4,011,374 issued Mar. 8, 1977 to Kaun for Porous Carbonaceous Electrode Structure And Method For Secondary Electrochemical Cell; and U.S. Pat. No. 4,087,905 issued May 9, 1978 to Cooper et al. for Method Of Preparing A Powdered Electrically Insulated Separator For Use In An Electrochemical Cell.

Previous electrochemical cells which operate at high temperatures in the range of between about 300° C. to about 600° C., have required the use of suitable high-temperature materials. For these electrochemical cells, refractory, electrically insulative material such as boron nitride and yttrium oxide have been fabricated into cloth, netting, felt, paper, and other fabrics to provide suitable interelectrode separators. Although these efforts have been successful to some extent, they involve difficult and expensive fabrications which are high labor-intensive processes. In addition, sometimes the separator components thus provided are not sufficiently tough and durable. Other oxides and nitrides of metals and metaloids such as magnesium oxide, calcium oxide, silicone nitride and aluminum nitride are available for use in powder form as taught by the Mathers et al. and Cooper et al. patents.

Both the Mathers et al. and Cooper et al. patents disclose the use of powdered ceramics but neither discriminates between ceramics which are sulfide compatible and ceramics which are not sulfide compatible; neither discriminates between undesirable ceramics which are soluble in the contemplated electrolytes and ceramics which are substantially insoluble in the electrolyte and are therefore desirable. Both the Mathers et al. and Cooper et al. patents disclose processes which are highly labor intensive and require substantial amounts of time to fabricate the separators disclosed therein, whereby neither of these patents teaches a method which is adaptable to high speed commercial production of components for the contemplated high-temperature electrochemical cells.

SUMMARY OF THE INVENTION

In view of the disadvantages of prior art methods of making components for high-temperature secondary electrochemical cells, it is an object of the present invention to provide improved methods of making electrodes and separators therefor for use in high-temperature secondary electrochemical cells.

Another object of the present invention is to provide a method of forming a component for a high-temperature secondary electrochemical cell having a positive electrode including a sulfide selected from the group consisting of iron sulfides, nickel sulfide, copper sulfide and cobalt sulfide, a negative electrode including an alloy of aluminum and an electrically insulating porous separator between the electrodes, the improvement comprising forming a slurry of solid particles dispersed in a liquid electrolyte including an alkali metal salt, casting the slurry into a form having the shape of one of the secondary electrochemical cell components and smoothing the exposed surface of the slurry, cooling the cast slurry to form a solid, and removing the solid secondary electrochemical cell component.

Yet another object of the present invention is to provide a method of forming an electrode for a high-temperature secondary electrochemical cell having a positive electrode including a sulfide selected from the group consisting of iron sulfides, nickel sulfides, copper sulfide and cobalt sulfide, a negative electrode including an alloy of aluminum and an electrically insulating porous separator between the electrodes, the improvement comprising forming a slurry of solid particles of an electrode-active material dispersed in a liquid electrolyte including an alkali metal salt, casting the slurry into a form having the shape of an electrode for the secondary electrochemical cell and smoothing the exposed surface of the slurry, cooling the cast slurry to form a solid, and removing an electrode for a secondary electrochemical cell.

A final object of the present invention is to provide a method of forming an electrically insulating porous separator for a high-temperature secondary electrochemical cell having a positive electrode including a sulfide selected from the group consisting of iron sulfides, nickel sulfide, copper sulfide and cobalt sulfide, a negative electrode including an alloy of aluminum and an electrically insulating porous separator between the electrodes, the improvement comprising forming a slurry of solid particles dispersed in a liquid electrolyte including an alkali metal salt, the solid particles being selected from the group of electrically insulating ceramics which are substantially insoluble in the electrolyte and sulfide compatible, casting the slurry into a form having the shape of a thin sheet and smoothing the exposed surface of the slurry, cooling the cast slurry to form a solid, and removing a solid secondary electrochemical cell separator having the interstices thereof completely filled with electrolyte.

DESCRIPTION OF THE FIGURES

FIG. 3 is another graphical illustration showing the relationship between utilization percent and current density for various electrical insulators used in electrochemical cells.

DETAILED DESCRIPTION OF THE INVENTION

Figure 1:
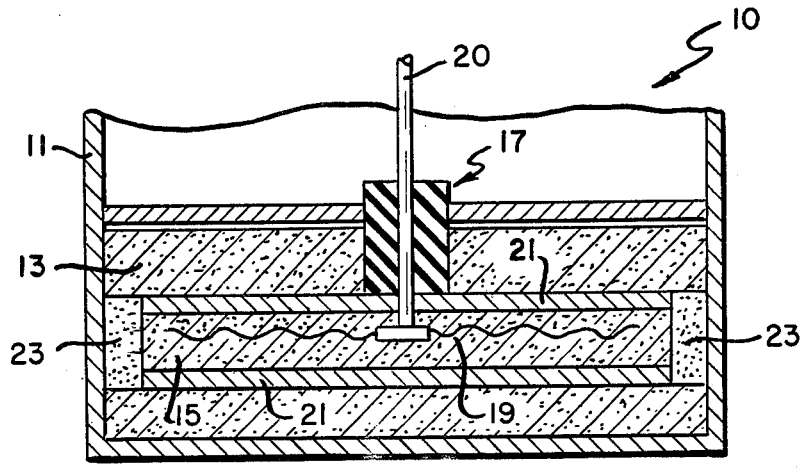
FIG. 1 is a cross-sectional view of a secondary electrochemical cell.

In FIG. 1 an electrochemical cell 10 is shown contained in an outer housing 11. The cell is illustrated with two negative electrodes 13 on either side of a positive electrode 15. An insulative feedthrough assembly 17 extends from the positive electrode 15 which contains a current collector 19 to outside cell 10 for electrical connection to a conductor 20. The negative electrodes 13 are in electrical contact with the housing 11 while the positive electrode 15 is separated from the two negative electrodes and the cell housing 11 by upper and lower insulators 21 and an annular insulator 23. During operation of the cell, these electrical insulators 21 must have sufficient porosity to permit permeation of molten electrolyte and ionic conduction between the electrodes 13 and 15.

While some prior art patents such as the Mathers et al. and Cooper et al. patents have taught the indiscriminate use of various oxides and nitrides of metals and metaloids as refractory or ceramic materials, certain of the materials are not desirable for use in an electrochemical cell with a sulfide in the positive electrode. For instance, yttrium oxide is not compatible with sulfides and should not be used while calcium oxide is too soluble in the electrolyte, hereinafter disclosed, and also should not be used. Acceptable insulative materials are magensium oxide, boron nitride, aluminum nitride, beryllium oxide, silicone nitride and thorium oxide. Thorium oxide, silicone nitride, beryllium oxide and aluminum nitride are expensive, thorium oxide has a low radioactivity and beryllium oxide is toxic. The preferred material is magnesium oxide because of its low cost and low weight.

The electrolyte used can be of various ion-containing materials, but for high-temperature electrochemical cells, electrolytic salt compositions that are molten at cell operating temperatures are employed. Temperatures in the range of from about 300° C. to about 600° C. are contemplated, and accordingly, electrolytic salt compositions of lithium chloride-potassium chloride or lithium chloride-lithium fluoride-potassium bromide are suitable. Other electrolytes which are acceptable are to be found in U.S. Pat. No. 3,488,221, and the preferred electrolyte for the present invention is the eutectic of lithium chloride and potassium chloride which has a melting point of 352° C., whereby that temperature becomes a minimum for the process or method steps herein set forth.

The inventive process may be used to fabricate any of the beforementioned cell components, that is the negative electrode 13, the positive electrode 15 or the separators 21. Broadly, the method includes forming a slurry of solid particles dispersed in the liquid electrolyte and casting same into a preheated mold, preferably steel and thereafter smoothing the exposed surface of the mold and cooling to form the solid component. Preferably, the inner surfaces of the mold are coated with a mold release such as carbon to facilitate removal of the cast component from the mold.

The separators 21 are preferably made of a mixture of magnesium oxide particles and the lithium chloride-potassium chloride eutetic. The electrolyte should be present in the range of from about 50 volume percent to about 80 volume percent, with the remainder being magnesium oxide particles having a blend of particle sizes in the range of particles that pass through a 40 mesh screen and are retained on about a 200 mesh screen, U.S. series. If the separators 21 contain less than about 50 volume percent electrolyte, then the ion transport between the negative electrode 13 and the positive electrode 15 is impaired. On the otherhand, if the electrolyte is present in amounts greater than about 80 volume percent, the ceramic powders become unstable and tend to slump to the bottom allowing the electrodes 13, 15 to expand at the top thereof and contact each other thereby shorting out the cell. Put in another way, the ratio of electrolyte to ceramic or refractory powder must be such that the powder is mechanically stable at the cell operating temperature.

A blend of particle sizes is preferably used for the ceramic powders. It has been found that for separators 21 it is advantageous to have powders of varying sizes. The preferred range for particle sizes is particles that are retained on a 200 mesh screen and particles that will pass through a 40 mesh screen, U.S. series. Within that range, it is preferred to have about 30 volume percent of the ceramic particles which will pass through a 40 mesh screen and be retained on an 80 mesh screen and about 70 volume percent of the ceramic particles which will pass through a 120 mesh screen and be retained on a 160 mesh screen.

Clearly, there is some room for variation in the preferred ratio of particles but a blend is definitely advantageous. If particles too large in size are used, then the electrolyte space is diminished and also the electrode material is able to migrate through the separator. If the powder is too small then the powder tends to slump to the bottom of the separator resulting in an expansion of the electrodes near the top thereof which can short out the cell.

To prepare the negative electrode 13 of the present invention, particles of the electrode-active material must be mixed with the electrolyte when the electrolyte is molten. Various electrode-active materials for negative electrodes are acceptable but for illustrative purposes a lithium-aluminum alloy is disclosed. Preferably, the lithium-aluminum alloy powder is present in a range of from about 60 to about 70 volume percent with the remainder being electrolyte. The slurry formed by the liquid electrolyte and lithium-aluminum powder is maintained in a temperature range of between about 352° C. and about 500° C., with the preferred temperature being in the range of from about 400° C. to about 450° C. Temperatures in excess of 500° C. are not preferred because of the increase in vapor pressure of the electrolyte, whereas temperatures less than 352° C. are not feasible due to the melting point of the eutetic. The actual molding or casting steps used for the electrode 13 is identical to that used for the separators 21 and include preheating the mold prior to the introduction of the slurry thereinto and smoothing the exposed surface prior to cooling to form the solid casting.

The positive electrode 15 may be made out of an electrode-active material such as iron sulfides like $FeS_2$ or FeS or a mixture thereof. Alternatively, a mixture of lithium sulfide and iron powder may be substituted or intermediate compounds such as $Li_2FeS_2$ may be employed. Irrespective of what electrode-active material is employed, it is ground into powders and admixed with molten electrolyte to form a slurry which is cast as aforesaid. Preferably, the electrode-active material for a positive electrode 15 is present in the range of between about 45 and about 50 volume percent, the casting taking place at the preferred temperature range previously discussed of about 400° to about 450° C.

When dealing with electrodes 13, 15, it is not required that the range of particle sizes be as broad as when fabricating the separators 21. Nevertheless, avoidance of all small particles, those passing through a 160 mesh screen is desirable to prevent migration or slumping of the electrode active materials to the bottom of the electrode. An acceptable range of powders would be powders passing through a 70 mesh screen and being retained on 100 or 120 mesh screen, this holding true for both the negative electrode 13 and the positive electrode 15.

An advantage of using the inventive casting method for the cell components, whether this be the electrodes 13, 15, or the separators 21 is that the component is totally filled with electrolyte. This improves the transfer characteristics for ions between the electrodes and the electrolyte. An additional feature of the present invention is that it is adaptable to rapid commercial production as opposed to hot and cold pressing methods which take consideration hand labor and fabrication time.

It will be understood that although the electrochemical cell illustrated in FIG. 1 and the described method involve three electrodes, that is two negative electrodes 13 and one positive electrode 15 and two layers of electrode separators 21, the invention is applicable to any high-temperature electrochemical cell having the electrodes thereof arranged in a stack or series. Various other cells 10 and electrode designs, as illustrated in some of the above-identified patents, can be arranged with the cast separators 21 described herein.

The following examples are presented to further illustrate the invention. Three cells 10 using boron nitride felt separators and one cell employing a precast magnesium oxide separator 21 were assembled. The cells using boron nitride felt separators are identified in the drawings. In the accompanying TABLE I cells SC-32, SC-33, and SC-34 employ 2 millimeter thick unstabilized boron nitride felt dusted with lithium aluminum chloride. The cell using the separator made in accordance with the present invention is identified as SC-31. The start-up procedure and status of these cells are summarized in TABLE I with the relationship of utilization percent to current density being illustrated in FIG. 2.

TABLE I

| Cell # | Separator Type | Status of Separator Cells | |
|---|---|---|---|
| | | Start-up Procedure | Status and Remarks |
| SC-31 | Pre-cast MgO Plates; 1.8 mm thick | One degassing operation at 450° C. | Operated for 91 days. Terminated voluntarily due to declining coulombic efficiency. |
| SC-32 | 2 mm unstabilized BN-Felts dusted with $LiAlCl_4$ | Gradually heated from room temperature to 450° C. under vacuum in 6 hrs. | Very short charge-discharge cycles because of poor wetting of felt. Neither degassing operations nor increased temperature improved wetting. Terminated after 14 days. |
| SC-33 | 2 mm unstabilized BN-Felts dusted with $LiAlCl_4$ | Gradually heated to 450° C. in 10 hrs. Degassed before cycling. Degassed again after one cycle. | Operating excellently for more than 23 days and 25 cycles |
| SC-34 | 4 mm unstabilized BN-Felts dusted with $LiAlCl_4$ | Same as SC-33 | Was very difficult to assemble because of increased separator thickness. Cell is in operation but has developed a slight short. |

Cell SC-31 maintained a coulombic efficiency of greater than 98 percent for the first 90 cycles but began to decline thereafter. The cell run was terminated after 91 days and 122 cycles of operation. The post test examination revealed that a short circuit developed when the positive electrode frame contacted one edge of the negative electrode frame. The beginning thickness of the separators 21 was 1.8 millimeters and the final thickness of the separator plates averaged 1.4 millimeters. The calculated reduction in the original separators 21 was 22% and the original porosity of the plate declined from 50% at start-up to 40% at termination.

Figure 2:
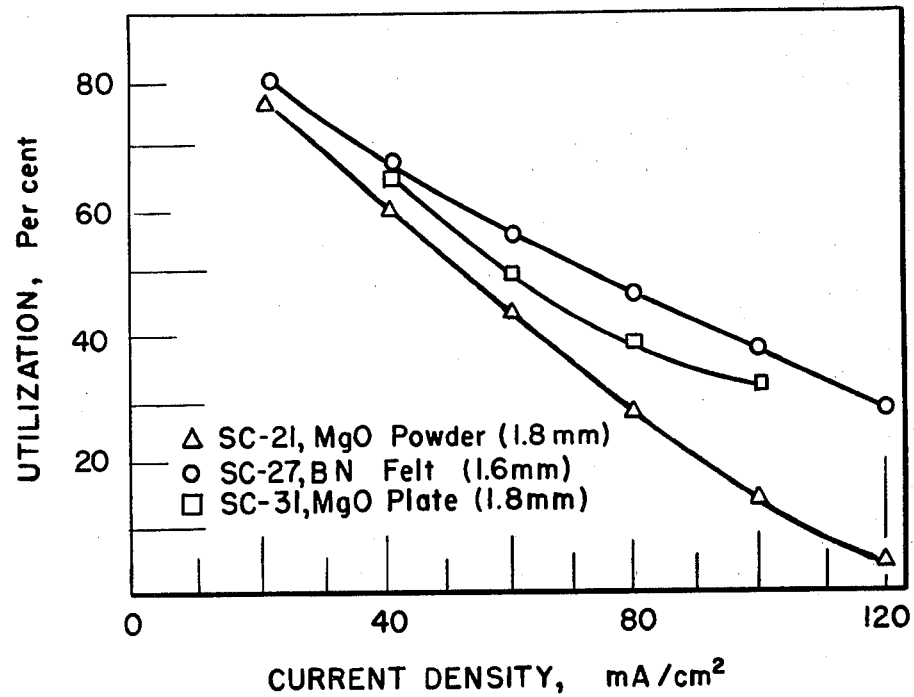
FIG. 2 is a graphical representation showing the relationship between utilization and current density for an electrochemical cell using different electrical insulators.

The utilization performance of cell SC-31 in comparison to other cells using approximately the same separator is illustrated in FIG. 2. The utilization of cell SC-31 at high current densities, that is greater than 50 $mA/cm^2$ was better than that of the cell which used a vibratory loaded magnesium oxide powder separator but less than the cell with the boron nitride felt separator.

FIG. 3 shows the utilization performance of four other cells with different types of separators including a ytterium oxide sintered separator. As can be seen, the separator performance for the SC-31 cell was superior to the SC-21 or SC-28 (at high current densities) thereby illustrating that the cast separators are superior to the compacted separators when the same ceramic or refractory material is used.

The combination of superior performance and improved production technique requiring less time per unit for production and less manual labor provides a significant advantage over the prior art. It can be seen from the above that the present invention provides a new process for producing components for high-temperature, high-power secondary electrochemical cells. Refractories as well as electrode-active material in powdered form can be easily formed into a slurry with molten electrolyte and cast in forms of any desired shape to produce the required cell component. The method is readily adaptable to commercial production techniques and will permit the formation of integral electrode separator structures by pouring alternate layers of material into a mold.

While there has been provided what at present is considered to be the preferred embodiment of the present invention, it will be understood that various modifications and alterations may be made therein without departing from the true scope of the present invention, and it is intended to cover in the claims appended hereto all such alterations and modifications.

The embodiment of the invention in which an exclusive property or privilege is claimed are defined as follows:

1. A method of forming a component for a high-temperature secondary electrochemical cell, said component being one of the group of secondary electrochemical cell components selected from a positive electrode, a negative electrode, and an electrically insulative porous separator, wherein said positive electrode including as positive electrode-active material, a sulfide selected from the group consisting of lithium sulfides, iron sulfides, nickel sulfides, copper sulfides and cobalt sulfides, said negative electrode including as negative electrode-active material, an alloy of aluminum and said electrically insulating porous separator being between said electrodes, the improvement comprising forming a slurry of solid particles dispersed in a molten electrolyte including alkali metal salt at a temperature above its melting point, said solid particles being selected from the group consisting of said positive-electrode-active material, said negative-electrode-active material and electrically insulating ceramics which are substantially insoluble in said electrolyte and sulfide compatable, casting said slurry into a form having the shape of one of said secondary electrochemical cell components and smoothing the exposed surface of the slurry, cooling said cast slurry to form a solid, and removing said secondary electrochemical cell component.

2. The method of claim 1, wherein said slurry is maintained at a temperature in the range of from about the melting point of the electrolyte to about 500° C. prior to casting.

3. The method of claim 1, wherein the slurry is maintained in the range of between about 400° C. and about 450° C.

4. The method of claim 1, wherein said electrolyte is a lithium chloride-potassium chloride eutetic.

5. The method of claim 1, wherein said slurry is poured into a preheated steel form having a carbonaceous mold release on the inside surfaces contacted by the slurry.

6. A method of forming an electrode for a high-temperature secondary electrochemical cell having a positive electrode including as positive-electrode-active material, a sulfide selected from the group consisting of lithium sulfides, iron sulfides, nickel sulfide, copper sulfide and cobalt sulfide, a negative electrode including as negative-electrode-active material, an alloy of aluminum and an electrically insulating porous separator between said electrodes, the improvement comprising forming a slurry of solid particles selected from the group consisting of said positive-electrode-active material and said negative-electrode-active material dispersed in a molten electrolyte including alkali metal salt at a temperature above its melting point, casting said slurry into a form having the shape of an electrode for said secondary electrochemical cell and smoothing the exposed surface of the slurry, cooling said cast slurry to form a solid and removing a solid electrode for a secondary electrochemical cell.

7. The method of claim 6, wherein the electrode-active material for the positive electrode is an iron sulfide and the electrode-active material for the negative electrode is an aluminum-lithium alloy.

8. The method of claim 6, wherein the electrode formed is the positive electrode and the solid particles are an iron sulfide present in the slurry in the range of from about 40% by volume to about 50% by volume.

9. The method of claim 6, wherein the electrode is the negative electrode and the particles are lithium-aluminum alloy and are present in the slurry in the range of from about 60% by volume to about 70% by volume.

10. A method of forming an electrically insulating porous separator for a high-temperature secondary electrochemical cell having a positive electrode including a sulfide selected from the group consisting of lithium sulfides, iron sulfides, nickel sulfide, copper sulfide and cobalt sulfide, a negative electrode including an alloy of aluminum and an electrically insulating porous separator between said electrodes, the improvement comprising forming a slurry of solid particles dispersed in a molten electrolyte including alkali metal salt at a temperature above its melting point, said solid particles being selected from the group of electrically insulating ceramics which are substantially insoluble in electrolyte and sulfide compatible, casting said slurry into a form having a shape of a thin sheet and smoothing the exposed surface of the slurry, cooling said cast slurry to form a solid, and removing a solid secondary electrochemical cell separator having the interstices thereof completely filled with electrolyte.

11. The method of claim 10, wherein said solid particles in said slurry are selected from the group consisting of magnesium oxide, boron nitride, aluminum nitride, beryllium oxide, silicon nitride, and thorium oxide.

12. The method of claim 10, wherein said solid particles in the slurry are a blend of sizes in the range of from about −40 to about +200 mesh.

13. The method of claim 12, wherein about 30 volume percent of the particles pass through a 40 mesh screen and are retained on a 70 mesh screen and about 70 volume percent of the particles pass through a 120 mesh screen and are retained on a 160 mesh screen.

14. The method of claim 10, wherein the electrolyte is the lithium chloride-potassium chloride eutetic.

15. The method of claim 10, wherein the cast separator has a thickness of less than about 2 millimeters.

* * * * *